United States Patent
Kahn et al.

(10) Patent No.: US 9,374,659 B1
(45) Date of Patent: Jun. 21, 2016

(54) METHOD AND APPARATUS TO UTILIZE LOCATION DATA TO ENHANCE SAFETY

(75) Inventors: Philippe Kahn, Santa Cruz, CA (US); Arthur Kinsolving, Santa Cruz, CA (US)

(73) Assignee: DP TECHNOLOGIES, INC., Scotts Valley, CA (US)

( * ) Notice: Subject to any disclaimer, the term of this patent is extended or adjusted under 35 U.S.C. 154(b) by 0 days.

(21) Appl. No.: 13/231,900

(22) Filed: Sep. 13, 2011

(51) Int. Cl.
*H04W 4/02* (2009.01)

(52) U.S. Cl.
CPC ........................................ *H04W 4/02* (2013.01)

(58) Field of Classification Search
CPC ........................................................ G01C 21/00
See application file for complete search history.

(56) References Cited

U.S. PATENT DOCUMENTS

| | | |
|---|---|---|
| 4,285,041 A | 8/1981 | Smith |
| 4,571,680 A | 2/1986 | Wu |
| 4,578,769 A | 3/1986 | Frederick |
| 5,446,725 A | 8/1995 | Ishiwatari |
| 5,446,775 A | 8/1995 | Wright et al. |
| 5,583,776 A | 12/1996 | Levi et al. |
| 5,593,431 A | 1/1997 | Sheldon |
| 5,654,619 A | 8/1997 | Iwashita |
| 5,778,882 A | 7/1998 | Raymond et al. |
| 5,955,667 A | 9/1999 | Fyfe |
| 5,960,350 A * | 9/1999 | Schorman et al. ............ 455/450 |
| 5,976,083 A | 11/1999 | Richardson et al. |
| 6,013,007 A | 1/2000 | Root et al. |
| 6,122,595 A | 9/2000 | Varley et al. |
| 6,135,951 A | 10/2000 | Richardson et al. |
| 6,145,389 A | 11/2000 | Ebeling et al. |
| 6,246,321 B1 | 6/2001 | Rechsteiner et al. |
| 6,282,496 B1 | 8/2001 | Chowdhary |
| 6,369,794 B1 | 4/2002 | Sakurai et al. |
| 6,428,490 B1 | 8/2002 | Kramer et al. |
| 6,493,652 B1 | 12/2002 | Ohlenbusch et al. |
| 6,496,695 B1 | 12/2002 | Kouji et al. |
| 6,513,381 B2 | 2/2003 | Fyfe et al. |
| 6,522,266 B1 | 2/2003 | Soehren et al. |
| 6,532,419 B1 | 3/2003 | Begin et al. |
| 6,539,336 B1 | 3/2003 | Vock et al. |
| 6,611,789 B1 | 8/2003 | Darley |
| 6,672,991 B2 | 1/2004 | O'Malley |
| 6,685,480 B2 | 2/2004 | Nishimoto et al. |
| 6,700,499 B2 | 3/2004 | Kubo et al. |
| 6,786,877 B2 | 9/2004 | Foxlin |
| 6,790,178 B1 | 9/2004 | Mault et al. |
| 6,813,582 B2 | 11/2004 | Levi et al. |
| 6,823,036 B1 | 11/2004 | Chen |
| 6,826,477 B2 | 11/2004 | Ladetto et al. |
| 6,836,744 B1 | 12/2004 | Asphahani et al. |
| 6,881,191 B2 | 4/2005 | Oakley et al. |

(Continued)

FOREIGN PATENT DOCUMENTS

WO 0188477 A 11/2001

OTHER PUBLICATIONS

"Sensor Fusion," www.u-dynamics.com, 2 pages.

(Continued)

*Primary Examiner* — Khalid Shaheed
*Assistant Examiner* — Frank Donado
(74) *Attorney, Agent, or Firm* — HIPLegal LLP; Judith Szepesi

(57) ABSTRACT

A method comprising tracking signal quality received by a mobile device, and flagging a location when a change in signal quality is detected.

13 Claims, 7 Drawing Sheets

(56) References Cited

U.S. PATENT DOCUMENTS

| | | |
|---|---|---|
| 6,885,971 B2 | 4/2005 | Vock et al. |
| 6,898,550 B1 | 5/2005 | Blackadar et al. |
| 6,928,382 B2 | 8/2005 | Hong et al. |
| 6,941,239 B2 | 9/2005 | Unuma et al. |
| 6,959,259 B2 | 10/2005 | Vock et al. |
| 6,975,959 B2 | 12/2005 | Dietrich et al. |
| 7,010,332 B1 | 3/2006 | Irvin et al. |
| 7,020,487 B2 | 3/2006 | Kimata |
| 7,054,784 B2 | 5/2006 | Flentov et al. |
| 7,057,551 B1 | 6/2006 | Vogt |
| 7,072,789 B2 | 7/2006 | Vock et al. |
| 7,092,846 B2 | 8/2006 | Vock et al. |
| 7,148,797 B2 | 12/2006 | Albert |
| 7,155,507 B2 | 12/2006 | Hirano et al. |
| 7,158,912 B2 | 1/2007 | Vock et al. |
| 7,169,084 B2 | 1/2007 | Tsuji |
| 7,171,331 B2 | 1/2007 | Vock et al. |
| 7,173,604 B2 | 2/2007 | Marvit et al. |
| 7,177,684 B1 | 2/2007 | Kroll et al. |
| 7,200,517 B2 | 4/2007 | Darley et al. |
| 7,212,943 B2 | 5/2007 | Aoshima et |
| 7,220,220 B2 | 5/2007 | Stubbs et al. |
| 7,254,516 B2 | 8/2007 | Case et al. |
| 7,297,088 B2 | 11/2007 | Tsuji |
| 7,328,611 B2 | 2/2008 | Klees et al. |
| 7,334,472 B2 | 2/2008 | Seo et al. |
| 7,353,112 B2 | 4/2008 | Choi et al. |
| 7,387,611 B2 | 6/2008 | Inoue et al. |
| 7,397,357 B2 | 7/2008 | Krumm et al. |
| 7,428,471 B2 | 9/2008 | Darley et al. |
| 7,451,056 B2 | 11/2008 | Flentov et al. |
| 7,457,719 B1 | 11/2008 | Kahn et al. |
| 7,467,060 B2 | 12/2008 | Kulach et al. |
| 7,512,515 B2 | 3/2009 | Vock et al. |
| 7,526,402 B2 | 4/2009 | Tanenhaus et al. |
| 7,608,050 B2 | 10/2009 | Shugg |
| 7,617,071 B2 | 11/2009 | Darley et al. |
| 7,640,134 B2 | 12/2009 | Park et al. |
| 7,640,804 B2 | 1/2010 | Daumer et al. |
| 7,647,196 B2 | 1/2010 | Kahn et al. |
| 7,653,508 B1 | 1/2010 | Kahn et al. |
| 7,752,011 B2 | 7/2010 | Niva et al. |
| 7,774,156 B2 | 8/2010 | Niva et al. |
| 7,811,203 B2 | 10/2010 | Unuma et al. |
| 7,857,772 B2 | 12/2010 | Bouvier et al. |
| 7,881,902 B1 | 2/2011 | Kahn et al. |
| 7,889,085 B2 | 2/2011 | Downey et al. |
| 7,892,080 B1 | 2/2011 | Dahl |
| 7,962,312 B2 | 6/2011 | Darley et al. |
| 7,987,070 B2 | 7/2011 | Kahn et al. |
| 8,095,146 B2 * | 1/2012 | Raghavachari ....... H04W 48/16 455/456.1 |
| 8,548,452 B2 * | 10/2013 | Coskun ................. G06Q 10/10 455/419 |
| 2001/0027375 A1 | 10/2001 | Machida et al. |
| 2002/0023654 A1 | 2/2002 | Webb |
| 2002/0027164 A1 | 3/2002 | Mault et al. |
| 2002/0089425 A1 | 7/2002 | Kubo et al. |
| 2002/0109600 A1 | 8/2002 | Mault et al. |
| 2002/0118121 A1 | 8/2002 | Lehrman et al. |
| 2002/0142887 A1 | 10/2002 | O'Malley |
| 2002/0151810 A1 | 10/2002 | Wong et al. |
| 2003/0018430 A1 | 1/2003 | Ladetto et al. |
| 2003/0048218 A1 | 3/2003 | Milnes et al. |
| 2003/0083596 A1 | 5/2003 | Kramer et al. |
| 2003/0093187 A1 | 5/2003 | Walker |
| 2003/0109258 A1 | 6/2003 | Mantyjarvi et al. |
| 2003/0139692 A1 | 7/2003 | Barrey et al. |
| 2003/0149526 A1 | 8/2003 | Zhou et al. |
| 2004/0138540 A1 * | 7/2004 | Baker et al. ................. 600/336 |
| 2004/0204840 A1 | 10/2004 | Hashima et al. |
| 2004/0219910 A1 | 11/2004 | Beckers |
| 2004/0225467 A1 | 11/2004 | Vock et al. |
| 2004/0236500 A1 | 11/2004 | Choi et al. |
| 2005/0033200 A1 | 2/2005 | Soehren et al. |
| 2005/0079873 A1 | 4/2005 | Caspi et al. |
| 2005/0107944 A1 | 5/2005 | Hovestadt et al. |
| 2005/0131736 A1 | 6/2005 | Nelson et al. |
| 2005/0202934 A1 | 9/2005 | Olrik et al. |
| 2005/0222801 A1 | 10/2005 | Wulff et al. |
| 2005/0232388 A1 | 10/2005 | Tsuji |
| 2005/0232404 A1 | 10/2005 | Gaskill |
| 2005/0234637 A1 | 10/2005 | Obradovich et al. |
| 2005/0238132 A1 | 10/2005 | Tsuji |
| 2005/0240375 A1 | 10/2005 | Sugai |
| 2005/0245275 A1 * | 11/2005 | Byford ................. H04W 4/02 455/456.6 |
| 2005/0248718 A1 | 11/2005 | Howell et al. |
| 2006/0020177 A1 | 1/2006 | Seo et al. |
| 2006/0030270 A1 * | 2/2006 | Cheng ........................ 455/67.11 |
| 2006/0063980 A1 | 3/2006 | Hwang et al. |
| 2006/0064276 A1 | 3/2006 | Ren et al. |
| 2006/0080551 A1 | 4/2006 | Mantyjarvi et al. |
| 2006/0100546 A1 | 5/2006 | Silk |
| 2006/0128371 A1 * | 6/2006 | Dillon et al. .................. 455/423 |
| 2006/0136173 A1 | 6/2006 | Case, Jr. et al. |
| 2006/0161377 A1 | 7/2006 | Rakkola et al. |
| 2006/0167387 A1 | 7/2006 | Buchholz et al. |
| 2006/0206258 A1 | 9/2006 | Brooks |
| 2006/0223547 A1 | 10/2006 | Chin et al. |
| 2006/0259268 A1 | 11/2006 | Vock et al. |
| 2006/0284979 A1 | 12/2006 | Clarkson |
| 2006/0288781 A1 | 12/2006 | Daumer et al. |
| 2007/0010259 A1 * | 1/2007 | Hoffmann ................. 455/456.1 |
| 2007/0037605 A1 | 2/2007 | Logan et al. |
| 2007/0038364 A1 | 2/2007 | Lee et al. |
| 2007/0061105 A1 | 3/2007 | Darley et al. |
| 2007/0063850 A1 | 3/2007 | Devaul et al. |
| 2007/0067094 A1 | 3/2007 | Park et al. |
| 2007/0073482 A1 | 3/2007 | Churchill et al. |
| 2007/0082789 A1 | 4/2007 | Nissila et al. |
| 2007/0125852 A1 | 6/2007 | Rosenberg |
| 2007/0130582 A1 | 6/2007 | Chang et al. |
| 2007/0142715 A1 | 6/2007 | Banet et al. |
| 2007/0208531 A1 | 9/2007 | Darley et al. |
| 2007/0213126 A1 | 9/2007 | Deutsch et al. |
| 2007/0250261 A1 | 10/2007 | Soehren |
| 2007/0260418 A1 | 11/2007 | Ladetto et al. |
| 2007/0260482 A1 | 11/2007 | Nurmela et al. |
| 2008/0024364 A1 | 1/2008 | Frederick Taylor |
| 2008/0059061 A1 | 3/2008 | Lee |
| 2008/0140338 A1 | 6/2008 | No et al. |
| 2008/0165737 A1 | 7/2008 | Uppala |
| 2008/0167801 A1 | 7/2008 | Geelen et al. |
| 2008/0171918 A1 | 7/2008 | Teller et al. |
| 2008/0231713 A1 | 9/2008 | Florea et al. |
| 2008/0254944 A1 | 10/2008 | Muri et al. |
| 2008/0311929 A1 | 12/2008 | Carro et al. |
| 2009/0043531 A1 | 2/2009 | Kahn et al. |
| 2009/0047645 A1 | 2/2009 | Dibenedetto et al. |
| 2009/0047925 A1 * | 2/2009 | Rahman ............... H04W 24/06 455/404.2 |
| 2009/0082994 A1 | 3/2009 | Schuler et al. |
| 2009/0138200 A1 | 5/2009 | Hunter et al. |
| 2009/0213002 A1 | 8/2009 | Rani et al. |
| 2009/0216704 A1 | 8/2009 | Zheng et al. |
| 2009/0234614 A1 | 9/2009 | Kahn et al. |
| 2009/0291664 A1 | 11/2009 | Sandberg et al. .......... 455/404.2 |
| 2009/0319221 A1 | 12/2009 | Kahn et al. |
| 2010/0056872 A1 | 3/2010 | Kahn et al. |
| 2010/0057398 A1 | 3/2010 | Darley et al. |
| 2011/0029229 A1 * | 2/2011 | Hui ....................... G01C 21/20 701/533 |
| 2011/0066364 A1 | 3/2011 | Hale |
| 2011/0195680 A1 * | 8/2011 | Shaffer ................. G01C 21/20 455/115.3 |
| 2012/0046862 A1 * | 2/2012 | Griffin ................. G01C 21/20 701/521 |

(56) References Cited

U.S. PATENT DOCUMENTS

2012/0071174 A1* 3/2012 Bao et al. ............... 455/456.3
2013/0035111 A1* 2/2013 Moeglein et al. ......... 455/456.1

OTHER PUBLICATIONS

Anderson, Ian, et al, "Shakra: Tracking and Sharing Daily Activity Levels with Unaugmented Mobile Phones," Mobile Netw Appl, Aug. 3, 2007, pp. 185-199.

Weckesser, P, et al, "Multiple Sensorprocessing for High-Precision Navigation and Environmental Modeling with a Mobile Robot," IEEE, 1995, pp. 453-458.

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Kalpaxis, Alex, "Wireless Temporal-Spatial Human Mobility Analysis Using Real-Time Three Dimensional Acceleration Data," IEEE Intl. Multi-Conf. on Computing in Global IT (ICCGI'07), 2007, 7 pages.

Park, Chulsung, et al, "ECO: An Ultra-Compact Low-Power Wireless Sensor Node for Real-Time Motion Monitoring," IEEE Int. Symp. on Information Processing in Sensor Networks, 2005, pp. 398-403.

Wang, Shu, et al, "Location Based Services for Mobiles: Technologies and Standards, LG Electronics MobileComm," IEEE ICC 2008, Beijing, pp. 1-66 (part 1 of 3).

Wu, Winston H, et al, "Context-Aware Sensing of Physiological Signals," IEEE Int. Conf. on Engineering for Medicine and Biology, Aug. 23-26, 2007, pp. 5271-5275.

Yoo, Chang-Sun, et al, "Low Cost GPS/INS Sensor Fusion System for UAV Navigation," IEEE, 2003, 9 pages.

\* cited by examiner

US 9,374,659 B1

METHOD AND APPARATUS TO UTILIZE LOCATION DATA TO ENHANCE SAFETY

FIELD

A method and apparatus related to global positioning systems, and more specifically to using GPS data to enhance safety.

BACKGROUND

More personal devices, such as smart phones and handheld communications systems, include global positioning system (GPS) chips in addition to communications capability.

However, coverage is still intermittent. Network connections, are not always available. Cellular network coverage may not always be available either. In these cases, the handheld communications system or smart phone becomes useless.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The present invention is concerned with enabling a system to flag a location, and provide guidance to that location. The location may be automatically or manually flagged because it is the starting point of a path, for example a hike. A location may be automatically flagged when the signal quality of one of a plurality of signals that can be received by a mobile device decreases. By flagging a location corresponding to the last known good quality signal, the user can be guided back to that location, if access to signal becomes a priority. For example, in case of emergency, the ability to call for assistance may be urgent. Using the flagging system, the user can quickly be guided to a location which highly likely has good quality signal. The signals may wireless network signals, cellular network signals, or other signals.

In one embodiment, when the system flags a location, it automatically maintains directions to return to the flagged location. In one embodiment, only the "last known good" flag is maintained for each type of signal. In one embodiment, the system collects flag data from multiple users, in a global database. In one embodiment, the data from the global database may be made available to the users, to provide information about expected signal coverage. The data from this database may be sold or shared with service providers, device providers, in one embodiment.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
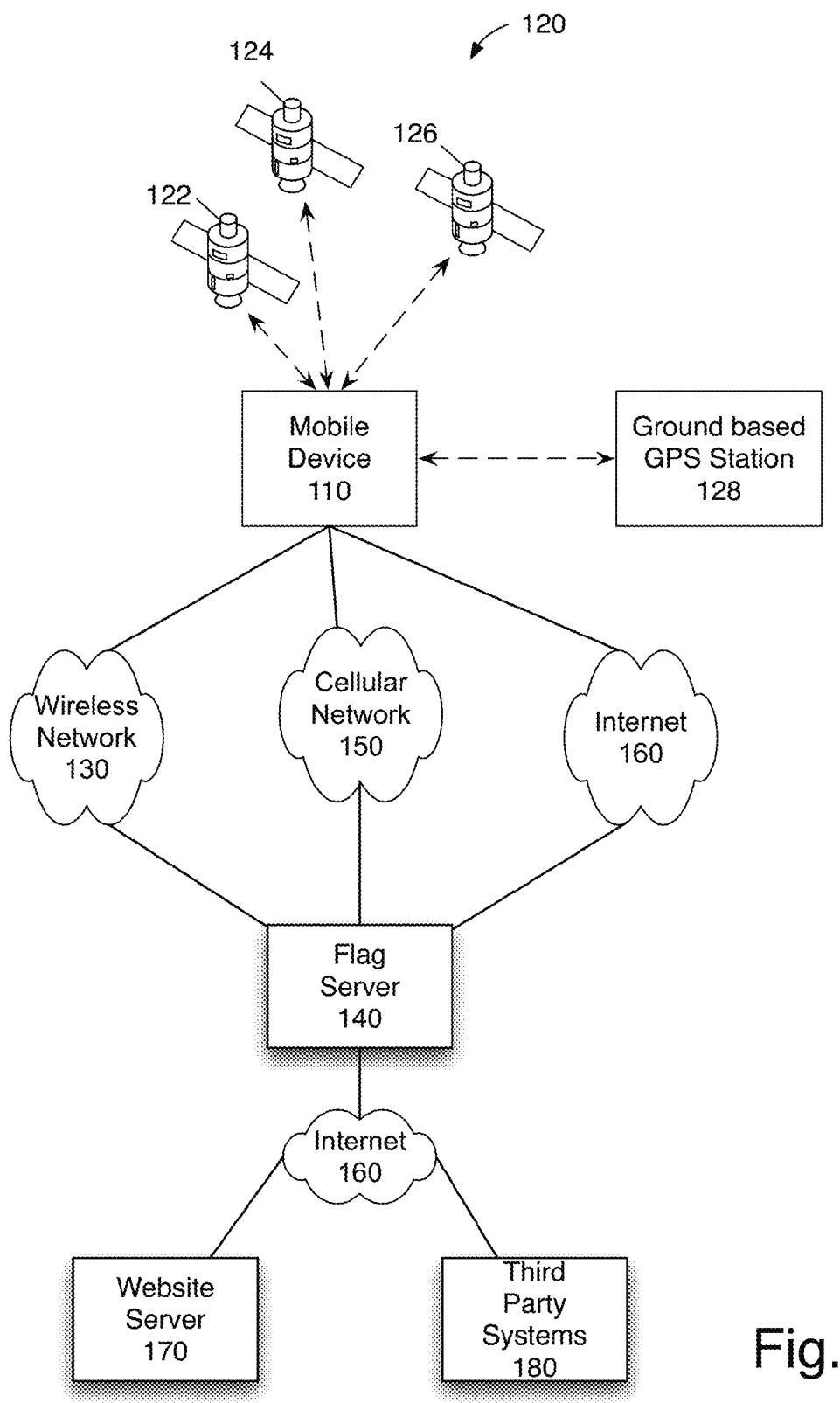
FIG. 1 is an exemplary system diagram of one embodiment a system.

FIG. 1 is an exemplary system diagram of one embodiment a system. The mobile device 110 receives data from one or more of a GPS network 120, a wireless network 130, a cellular network 150, and another type of Internet connection 160. The GPS network 120 may include GPS satellites 122, 124, 126 and/or ground based GPS stations 128. The wireless network 130 may be a wireless signal in accordance with the Wi-Fi standard (IEEE 802.11). The cellular network 150 may be a cellular network service, such as the cellular services provided by AT&T, Verizon, or another company. The Internet connection 160 may be another type of network connection, such as a wired network connection, or a connection through an intermediary device such as a computer system.

The mobile device 110 may track the availability of wireless network signal and/or cellular signal, and flag the last known good location of the signal(s). In one embodiment, the mobile device 110 may also access flags previously recorded, by the user or by others, via flag server 140. Mobile device 110 may connect to flag server in various ways, e.g. through cellular, wireless, Internet, or through an intermediary such as a computer system to which the mobile device may be occasionally coupled. In one embodiment, the system may also store GPS signal strength data flags. Since GPS signal strength varies based on the current satellite configuration data, this information is associated with a time and date, so that it can be aligned with the known satellite configuration. The satellite configuration data is publicly available.

The flag server 140 receives flags from the mobile device 110, placed as loss of signal quality is detected. In one embodiment, the flags are received periodically, when placed, or when the mobile device 110 is again connected a high bandwidth network.

In one embodiment, flag server 140 may make the flagging data available to a website 170 or third party systems 180. This may be used to refine coverage areas, determine coverage holes, or otherwise assess locations of interest.

Figure 2:
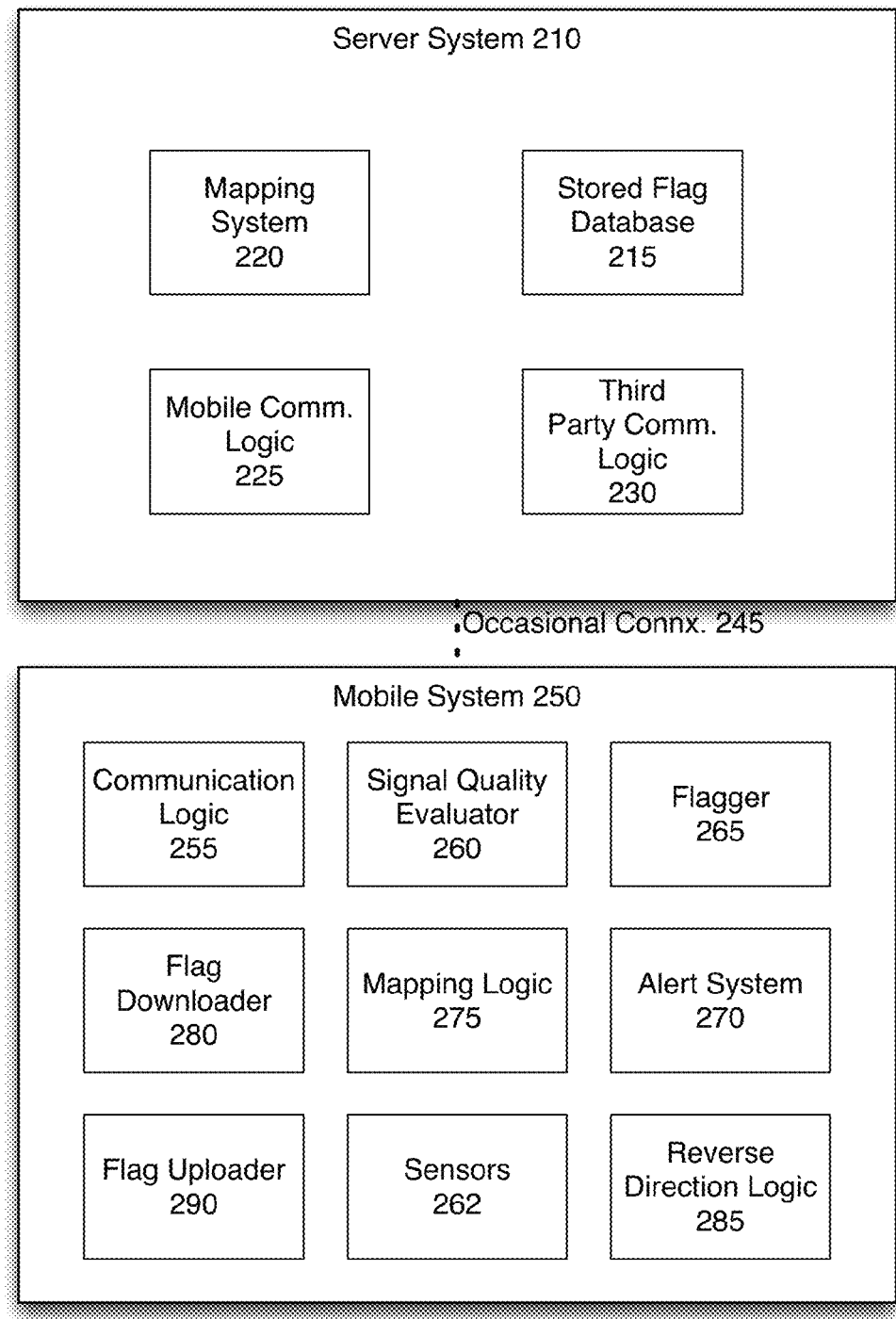
FIG. 2 is a block diagram of one embodiment of the mobile system and server.

FIG. 2 is a block diagram of one embodiment of the mobile system and server. The mobile system 250 is coupled through occasional connection 245 to server system 210.

Server system 210 includes a stored flag database 215, in which flag data received from various mobile systems is stored. In one embodiment, database 215 may be a distributed database. In one embodiment, database 215 may further include data obtained from other sources. For example, cellular providers make their coverage maps available. In one embodiment, flag database 215 may include data obtained from such coverage maps, or other third party sources. In one embodiment, if GPS signal quality is tracked, the GPS satellite path data is also obtained from a third party source.

Mapping system 220 enables server 210 to display a map of flags from database 215. In one embodiment, this map may be made available though a website interface, or other interface.

Mobile communication logic 225 receives flag data form mobile systems, and makes flag data available to mobile systems. Third party communications logic 230 makes the flag data available to other systems, including in one embodiment through a website. The third party communication logic 230 may also, in one embodiment, obtain data from third parties, as noted above. Third party communications logic 230 may be available to users, network signal providers, hardware device manufacturers, government entities, or other third parties. In one embodiment, the data may be made available on a subscription basis. The data may further be exported in various formats.

Mobile system 250 includes communication logic 255 to obtain data from, and send data to, server system 210. Communications logic 255 may include multiple types of signals, e.g. wireless, cellular, GPS, etc. Mobile system 250 may further include sensors 262 which may be used to add information for signal evaluation and direction logic. Sensors 262 may include one or more of: a gyroscope, an accelerometer, a barometer, a compass, a thermometer.

Signal quality evaluator 260 evaluates signal quality for one or more signals. As noted above, these signals can include one or more of GPS, wireless, cellular, or other signals. When the signal quality evaluator 260 detects a significant drop in signal quality, flagger 265 flags the location. Flagger 265 works with mapping logic 275, to locate the flag. In one embodiment, an alert system 270 may indicate to the user that signal quality has dropped, or that signal is no longer available. In one embodiment, flagger 265 maintains a flag for the last known good signal location. In one embodiment, separate flags may be maintained for each signal type. In one embodiment, the user may manually add flags, via flagger 265. When the user manually adds a flag, it may be a flag for routing, or a flag to manually indicate loss of signal quality.

Reverse direction logic 285, in one embodiment, tracks the user's motion past the last known good signal flag, and maintains directions back to that location. This can be useful in an emergency situation or if the user needs to reach signal for another reason. In one embodiment, the system ensures that even if the mobile system cannot receive signal, reverse direction logic 285 can provide guidance to the user to the last known good signal location.

In one embodiment, mobile system 250 may download flag data from server system 210, using flag downloader 280. In one embodiment, flags downloaded in this way are shown with mapping logic 275. In one embodiment, downloaded flags are differentiated from mobile system placed flags, by color, size, or another differentiator. However, having downloaded flags enables a user to see where signal loss may be expected.

Flag uploader 290 provides the flags placed by the mobile system 250 back to server system 210. In one embodiment, flag uploader 290 uploads flags whenever the mobile system 250 is coupled to the server system 210 through a high bandwidth connection. In another embodiment, the user may optionally initiate the uploading of flag data. In another embodiment, the mobile system may upload flag data when the mobile system 210 has placed one or more flags which do not correspond to existing flags obtained via flag downloader 280.

Figure 3:
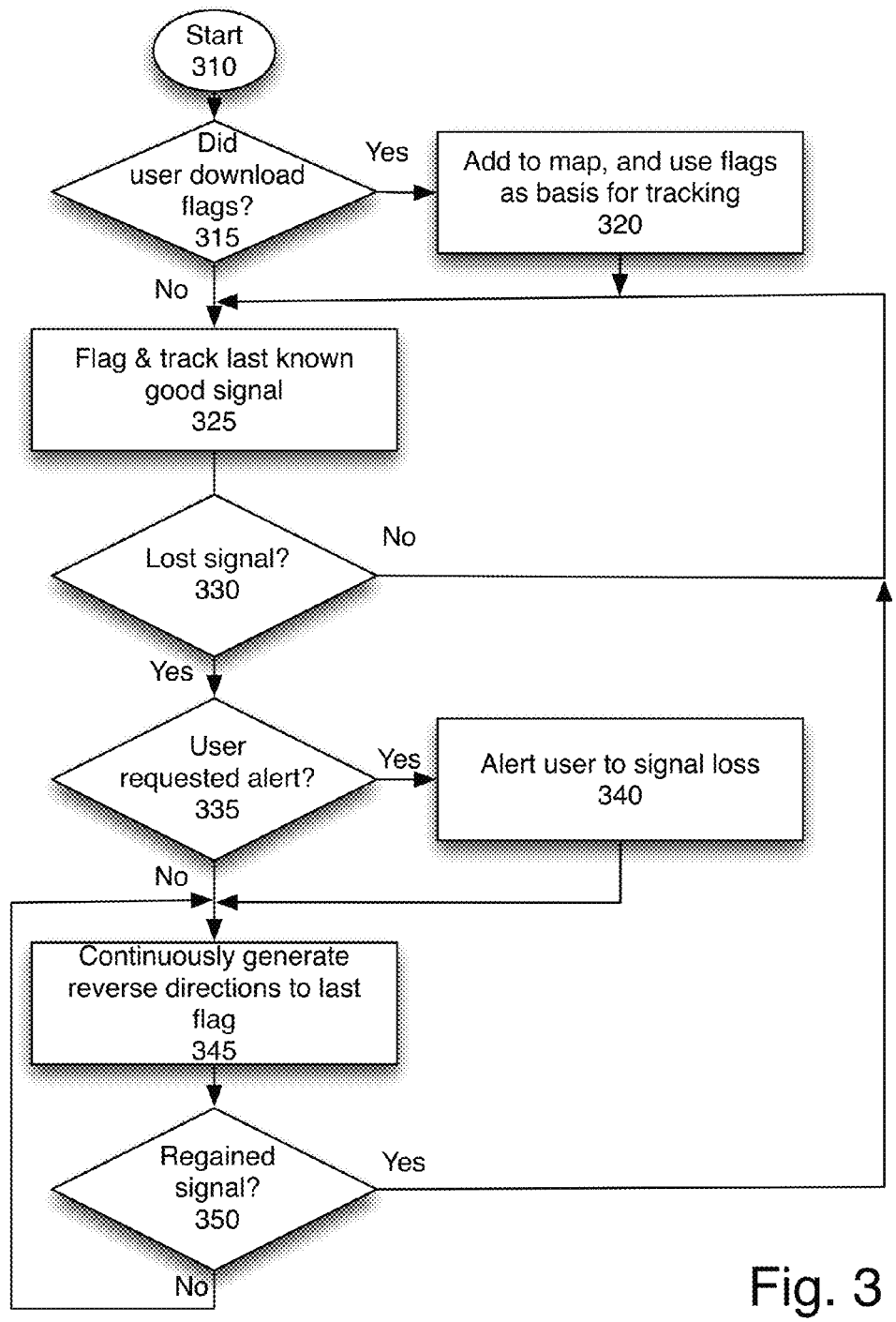
FIG. 3 is a flowchart of one embodiment of using the flagging system.

FIG. 3 is a flowchart of one embodiment of using the flagging system. The process starts at block 310. In one embodiment, this process may be active whenever the mobile device is receiving signals. In one embodiment, the system may be activated by the user. In another embodiment, the system may be activated when certain conditions are met. In one embodiment, the user may manually activate the system. In another embodiment, the system may be activated when the user enters a new area for which the user does not already have a strong flagging data.

At block 315, the process determines whether the user downloaded any flags. If so, at block 320, the system adds the downloaded flags to the map. In one embodiment, the downloaded flags are used as the basis for testing, as well.

At block 325, the process adds a flag whenever one of the tested signals is significantly reduced in quality. The flag, in one embodiment, is added at the last known good signal location. In another embodiment, the flag may be added at the location when the signal is lost, with directionality. In another embodiment, the flagging may mark map areas with signal information, when available, instead of placing individual flags.

At block 330, the process determines whether the signal has been lost. In one embodiment, a signal is considered lost when the quality of the signal is sufficiently bad to keep a device from making use of the signal. For example, for a GPS signal, if the GPS circuitry cannot get at least three satellite fixes, it cannot calculate location. For a cellular signal, if the signal does not permit a telephone call to be placed or received, it is considered a lost signal. In one embodiment, if calls are dropped, the signal is considered dropped. For a wireless signal, if a significant percentage of packets or pings is not successfully received, it is considered lost. In one embodiment, the device has the capability of determining whether the signal is lost based on the automatic periodic pings built into to the protocol.

If the signal is not lost, the process returns to block 325, to flag and track the last known good signal.

If the signal is lost, the process continues to block 335. At block 335, the process determines whether the user has requested an alert when signal is lost. If so, at block 340, the user is alerted.

At block 345, the process continuously generates reverse directions to the last flag, in one embodiment. In one embodiment, this is only done if the signal lost is the cellular signal used to obtain mapping data, or GPS signal. If the signal lost is not a cellular or GPS signal, the system instead formats the last known good flag location such that the GPS system can route back to the flag.

At block 350, the process determines whether the signal has been regained. If the signal has not been regained, the process continues to block 345 to continue generating reverse directions. If the signal has been regained, the process returns to block 325, to flag & track the last known good signal. In one embodiment, this involves removing the last flag, and replaces it with a new flag when the signal is regained. Note that while the flag may be removed from the user's display (e.g. no longer shown) it remains in the user's system, and is available for later upload or use.

Figure 4:
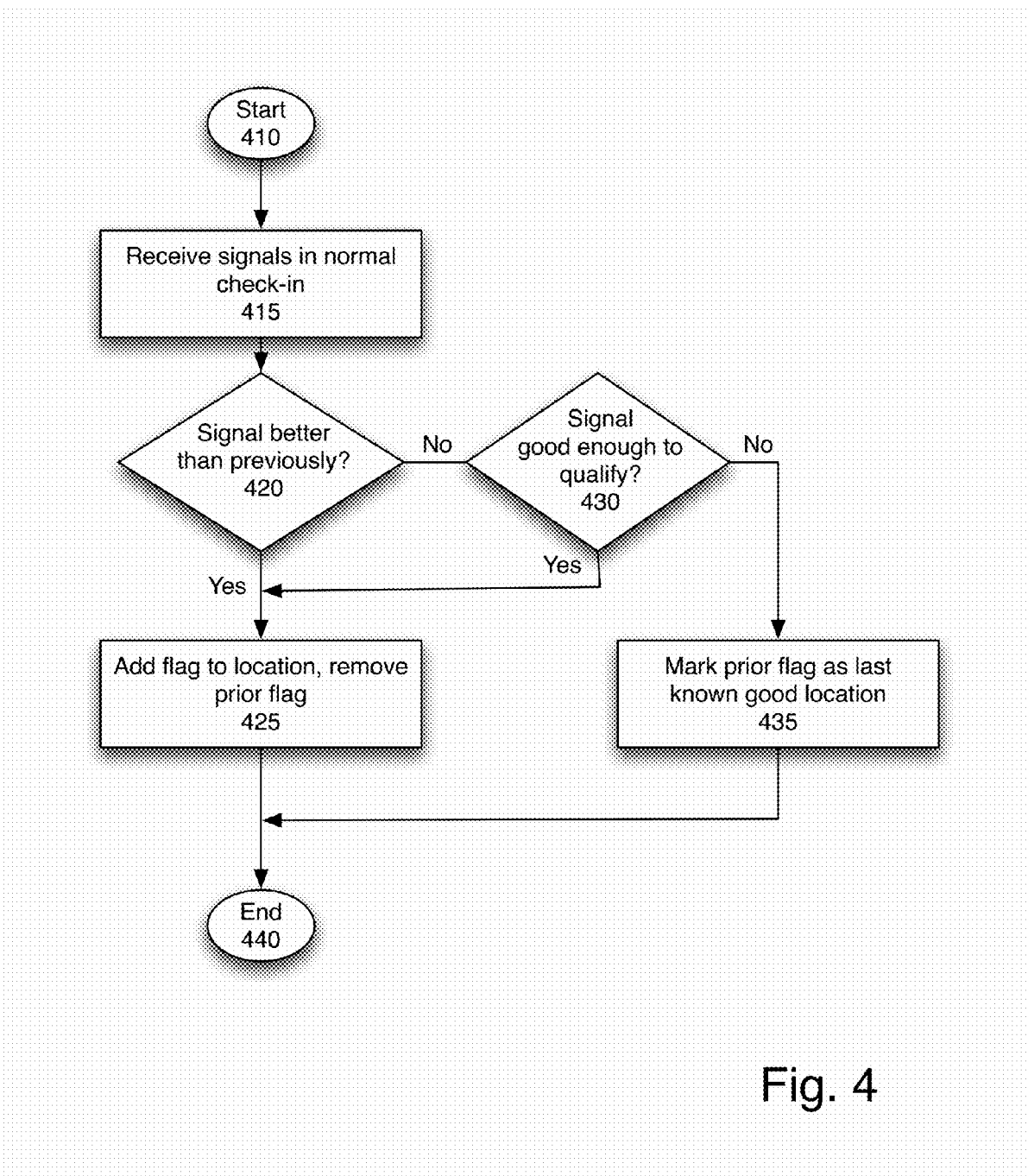
FIG. 4 is a flowchart of one embodiment of flagging using the system.

FIG. 4 is a flowchart of one embodiment of flagging using the system. The process starts at block 410. In one embodiment, this flowchart corresponds to block 325, of FIG. 3.

Returning to FIG. 4, at block 415, signals are received in a normal check-in. The normal check in may be the ping sent according to each signal's protocol. In one embodiment, the system may do periodic check-ins. In one embodiment, if the system does independent checking, not protocol dependent, then in one embodiment, the testing depends on one or more of: time elapsed, distance moved, and previously recorded signal strength. At block 415, signals are received. Note that while this flowchart addresses "signals" each of the signals tested may be on a separate flowchart of testing, with separate timing and conditions.

At block 420, the process determines whether the signal is better than the previous signal. If the signal is better than previously, the process continues to block 425. At block 425, add a flag to the location, and remove the prior location. At this point, the new location marks a "known good" location. The process then ends, at block 440.

If the signal is not better than the previously marked signal, the process continues to block 430. At block 430, the process determines whether the signal is good enough to qualify as a "known good" signal. If so, at block 425, a flag is added to the location. In one embodiment, if the difference in signal quality is above a threshold, the new flag marks a "known good, but not excellent" level, e.g. is different from the prior marking flag, which is maintained. The process then ends.

If, at block 430, the process determined that the signal was not good enough, the process continues to block 435, where the last flag is marked as a "last known good location." As noted above with respect to FIG. 3, the system uses this flag for guidance, and may make such flags available to the server.

Figure 5:
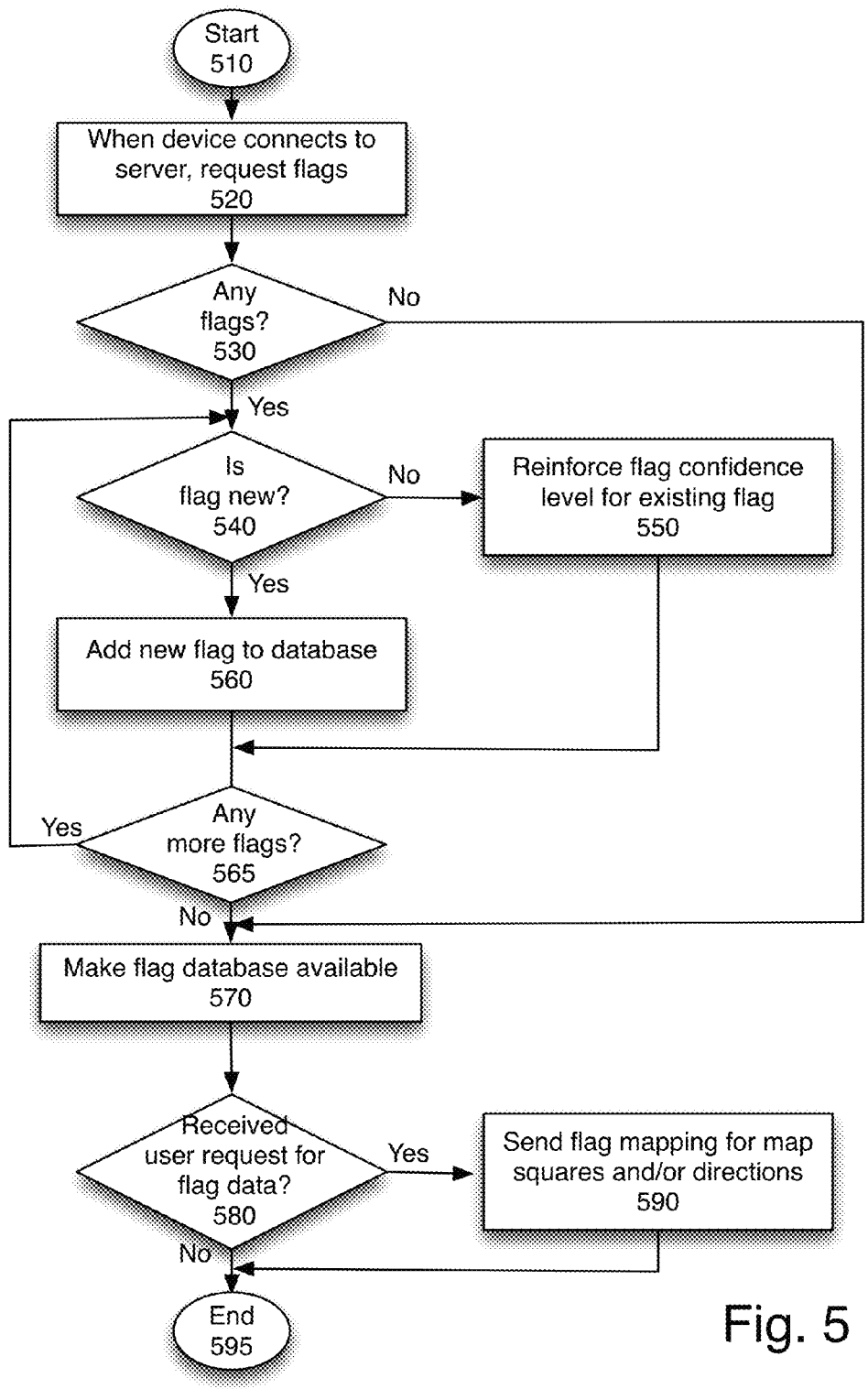
FIG. 5 is a flowchart of one embodiment of server interactions.

FIG. 5 is a flowchart of one embodiment of server interactions. The process starts at block 510. In one embodiment, the process is initiated when a mobile device that has the flagging application connects to the server, via a high bandwidth connection. In one embodiment, the process may be initiated when a computer device, which is designed to be coupled to the mobile device, is coupled to the server. In one embodiment, the high bandwidth connection is a wireline connection to a computer device, which in turn is coupled to the server.

At block 520, when the connection is established, the server requests the new flags recorded by the device. In one embodiment, the flags are free of identifying information (e.g. user data) so that only signal type, location, date/time is included with the flag. In another embodiment, the source device is identified, but no personally identifiable data is included. This may be useful when a particular device consistently produces different results than other devices. For example, if a mobile telephone's antenna is damaged, it may not find good quality cellular network connections in places where others do. By including device-identification data, such false data may be removed from the database.

At block 530, the server determines whether any flags were received. If no flags were received, the process continues directly to block 570. If flags were received, the process continues to block 540.

At block 540, the process determines whether a selected flag is new. A new flag indicate a location that has not previously been identified as a "last good signal" location. If the flag is new, the new flag is added to the database, at block 560. If the flag is not new, the flag confidence level for the existing flag is reinforced, at block 550. In one embodiment, flag confidence level simply indicates the number of times that someone found this flag to be accurate (e.g. last known good signal). In one embodiment, flags within a small distance of each other may be used to reinforce or weaken the value of a particular flag. For example, if a first user places a flag at point A, and the second user places the flag at point A+50 feet, the system would reinforce the first flag, at point A. This is to ensure that the system does not end up with a morass of flags, which would make it impossible to determine a last known good signal location.

At block 565, the process determines whether there are any more flags to evaluate. If so, the process returns to block 540, selecting the next flag to determine whether it is a new flag.

If there are no more flags to evaluate, the process, at block 570, makes the flag database available. Although this is shown as a flowchart, in one embodiment, the flag database is always available, and the updated flag database, including the newly added flags are made available.

Figure 6:
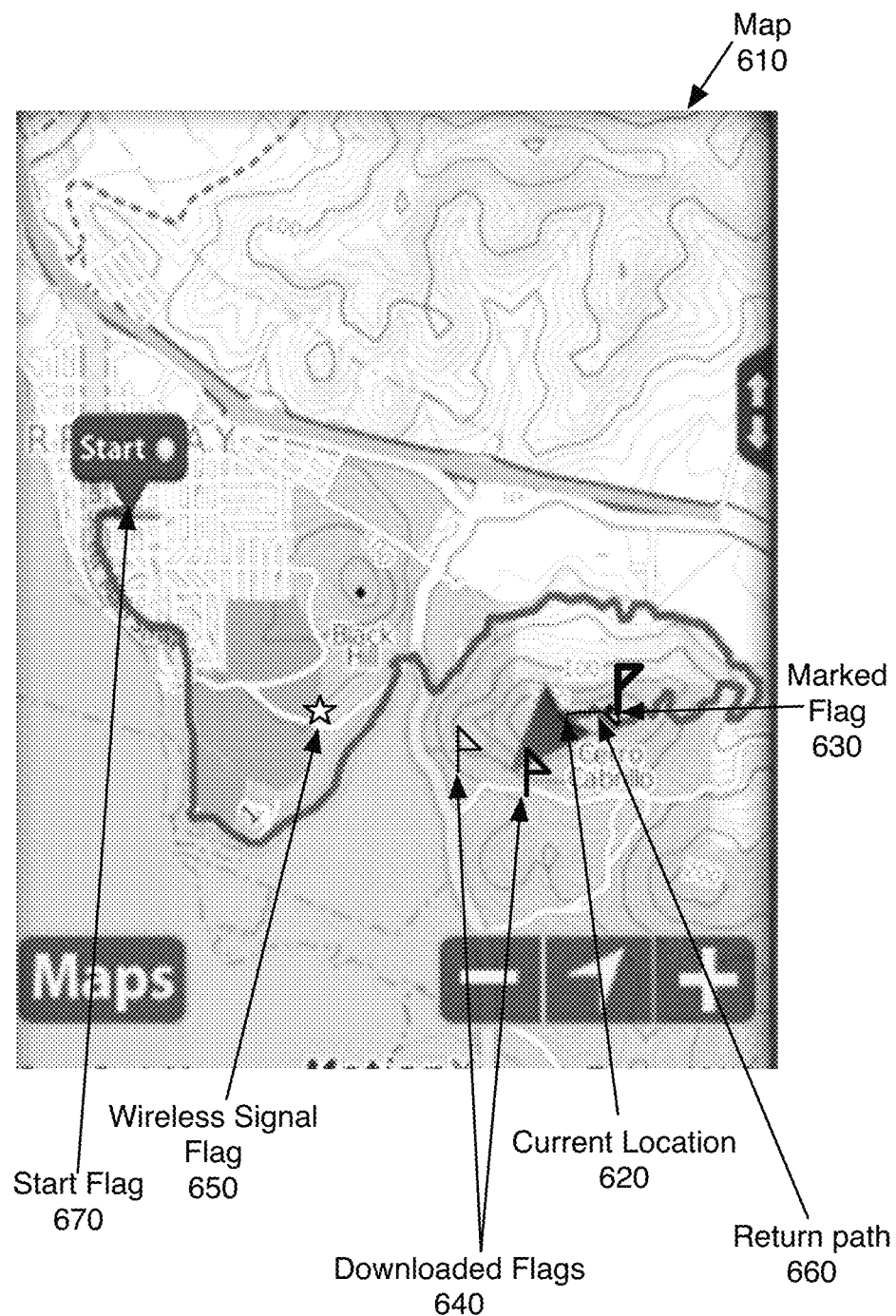
FIG. 6 is a diagram one embodiment of a user interface.

At block 580, the process determines whether the system received a request for flag data. If so, at block 590, flag mapping data is sent to the user in response to the request. In one embodiment, the user may request flag data by directions/path, zip code, area, county, selected map view, or another selection. In one embodiment, the flag mapping data provides flags for a designated area, indicated by the request, with indications of the confidence interval in that flag. FIG. 6 shows one embodiment of such flag information. The process then ends at block 595.

FIG. 6 is a diagram one embodiment of a user interface. As can be seen, the map 610 shows the user's current location 620. A flag 630 shows "last known good signal" as marked by the user's system, for a cellular network signal. In contrast, downloaded flags 640 show other areas of good signal, which the user may reach. The confidence interval in the flag may be visually represented on the map. Here, it is shown by the thickness of the line. However, one of skill in the art would understand that such flags may be differentiated by color, pattern, label, or any other visual queue. Wireless signal flag 650 is also shown, indicating the last known good wireless signal. In one embodiment, the flags for different signal types are distinct, and the flags for marked flags and downloaded flags are also distinct. In one embodiment, start flag 670, manually added by the user, is also shown and distinct from the other flags.

In one embodiment, the map also shows a return path 660 (here indicated by a black line) to the nearest marked flag 630. In one embodiment, the return path 660 is designed to provide direction information, even if no signals are available. In one embodiment, if no signals are available, the return path 660 indications may be based on accelerometer measurements of the mobile device. This enables the directing of the user back to a last known good signal, even in a situation where all live signals are lost.

Figure 7:
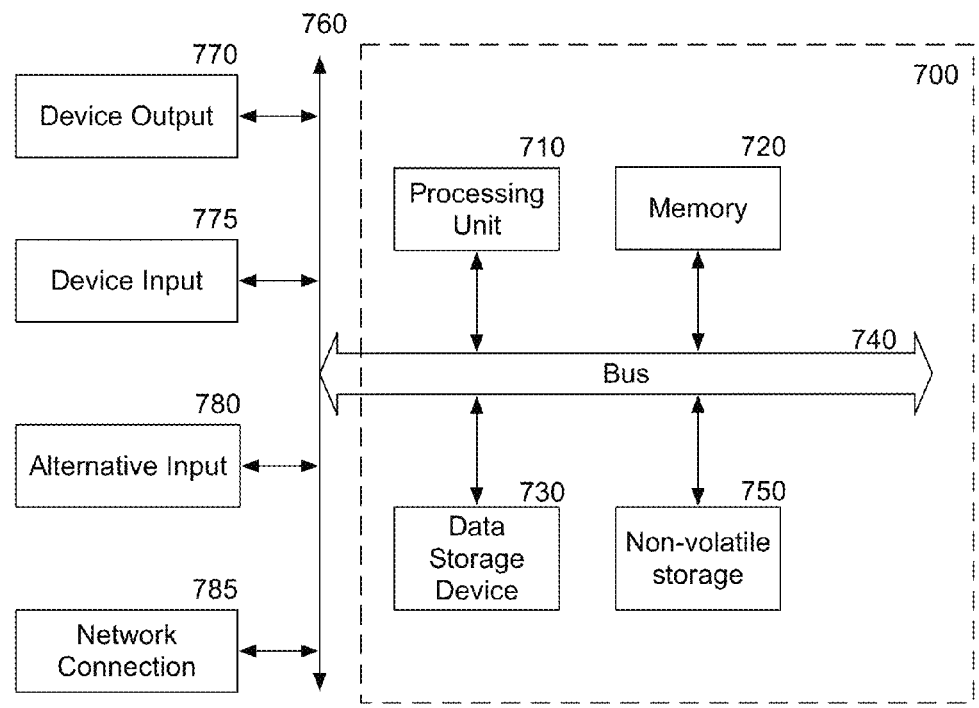
FIG. 7 is one embodiment of computer system that may be used with the present invention.

FIG. 7 is one embodiment of computer system that may be used with the present invention. FIG. 7 is a block diagram of a particular machine that may be used with the present invention. It will be apparent to those of ordinary skill in the art, however that other alternative systems of various system architectures may also be used.

The data processing system illustrated in FIG. 7 includes a bus or other internal communication means 740 for communicating information, and a processing unit 710 coupled to the bus 740 for processing information. The processing unit 710 may be a central processing unit (CPU), a digital signal processor (DSP), or another type of processing unit 710.

The system further includes, in one embodiment, a random access memory (RAM) or other volatile storage device 720 (referred to as memory), coupled to bus 740 for storing information and instructions to be executed by processor 710. Main memory 720 may also be used for storing temporary variables or other intermediate information during execution of instructions by processing unit 710.

The system also comprises in one embodiment a read only memory (ROM) 750 and/or static storage device 750 coupled to bus 740 for storing static information and instructions for processor 710. In one embodiment the system also includes a data storage device 730 such as a magnetic disk or optical disk and its corresponding disk drive, or Flash memory or other storage which is capable of storing data when no power is supplied to the system. Data storage device 730 in one embodiment is coupled to bus 740 for storing information and instructions.

The system may further be coupled to an output device 770, such as a cathode ray tube (CRT) or a liquid crystal display (LCD) coupled to bus 740 through bus 760 for outputting information. The output device 770 may be a visual output device, an audio output device, and/or tactile output device (e.g. vibrations, etc.)

An input device 775 may be coupled to the bus 760. The input device 775 may be an alphanumeric input device, such as a keyboard including alphanumeric and other keys, for enabling a user to communicate information and command selections to processing unit 710. An additional user input device 780 may further be included. One such user input device 780 is cursor control device 780, such as a mouse, a trackball, stylus, cursor direction keys, or touch screen, may be coupled to bus 740 through bus 760 for communicating direction information and command selections to processing unit 710, and for controlling movement on display device 770.

Another device, which may optionally be coupled to computer system 700, is a network device 785 for accessing other nodes of a distributed system via a network. The communication device 785 may include any of a number of commercially available networking peripheral devices such as those used for coupling to an Ethernet, token ring, Internet, or wide area network, personal area network, wireless network or other method of accessing other devices. The communication device 785 may further be a null-modem connection, or any other mechanism that provides connectivity between the computer system 700 and the outside world.

Note that any or all of the components of this system illustrated in FIG. 7 and associated hardware may be used in various embodiments of the present invention.

It will be appreciated by those of ordinary skill in the art that the particular machine which embodies the present invention may be configured in various ways according to the particular implementation. The control logic or software implementing the present invention can be stored in main memory 720, mass storage device 730, or other storage medium locally or remotely accessible to processor 710.

It will be apparent to those of ordinary skill in the art that the system, method, and process described herein can be implemented as software stored in main memory 720 or read only memory 750 and executed by processor 710. This control logic or software may also be resident on an article of manufacture comprising a computer readable medium having computer readable program code embodied therein and being readable by the mass storage device 730 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 720.

The handheld device may be configured to include a set of buttons or input signaling components with which a user may select from a set of available options. These could be considered input device #1 775 or input device #2 780. The handheld device may also be configured to include an output device 770 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processing unit 710, a data storage device 730, a bus 740, and memory 720, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 785.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 710. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
    tracking a plurality of signal qualities received by a mobile device;
    identifying a drop in the signal quality by comparing a current signal quality to an immediately prior signal quality, where the immediately prior signal quality was above a threshold associated with a good signal quality;
    the mobile device placing a flag at a location of a last known good signal in response to the drop in the signal quality, the flag indicating a last known good signal location detected by the mobile device, the last known good signal location being the location where the mobile device received the immediately prior signal quality;
    turning on a reverse direction logic and continuously generating reverse directions to the flag indicating the last known good signal location to enable the generation of the reverse directions when signal data for location determination is unavailable, the reverse directions generated based on an available one or more of: global positioning data obtained from a global positioning system (GPS) and network triangulation data obtained from a cellular network connection;
    adding the flag to a global database and making the global database of flag data obtained from a plurality of mobile devices available, the global database useful to determine a coverage of each of the plurality of signals, the flag data not obtainable from the GPS data;

pre-populating an area with predicted flags, based on information in the global database, the prepopulating enabling the user to obtain directions to a predicted flag, the flag data obtained from a wireless network when the wireless network is available and from the cellular network connection when the wireless network connection is not available;

monitoring the signal quality, and, when the signal quality is above a threshold, removing the flag and turning off the generating of the reverse directions.

2. The method of claim 1, further comprising:

upon request, providing the directions to the location associated with the last known good quality of the signal.

3. The method of claim 1, wherein the signal associated with the drop in signal quality is one of: a wireless signal and a cellular network signal.

4. The method of claim 1, wherein information in the global database associated with a location data of a flag additionally includes one or more of: receiving device, cellular carrier, chip set, time and day, and proximate location of the device and the user.

5. The method of claim 1, wherein the continuously generating directions to the flag comprises:

flagging a position of a track; and maintaining directions to the flagged position when one or more signals used for directions becomes unavailable using one or more of GPS data, motion detector data, and network triangulation data.

6. The method of claim 1, further comprising:

after a flag is placed, continuously calculating directions from a current location to the flag until the current location is determined to have a signal quality above a threshold.

7. A mobile system comprising:

a signal quality evaluator to periodically evaluate a quality of a signal by comparing a current signal quality to a last in time signal quality and comparing the signal quality to a threshold, where the last in time signal quality was above a threshold associated with a good signal quality;

a flagger to flag a last in time location where the signal quality was evaluated as being above the threshold, in response to the signal quality evaluator indicating that the quality of the signal is below the threshold;

a reverse direction logic to turn on and continuously calculate reverse directions to the flag of the last in time location where the signal quality was evaluated as being above the threshold, the reverse direction logic to utilize motion sensor data when location signal data is not available, the reverse directions calculated based on an available one or more of: global positioning data obtained from a global positioning system (GPS) and network triangulation data obtained from a cellular network connection;

the flagger to:

add the flag to a global database and make the global database of flag data obtained from a plurality of mobile devices available, the global database useful to determine a coverage of each of the plurality of signals, the flag data not obtainable from the GPS data;

pre-populate an area with predicted flags, based on information in the global database, the prepopulating enabling the user to obtain directions to a predicted flag, the flag data obtained from a wireless network when the wireless network is available and from the cellular network connection when the wireless network connection is not available;

the flagger to remove the flag, and after further monitoring of the signal quality, the reverse direction logic to turn off the calculation of the reverse directions, when the signal quality evaluator determines that a current signal quality is above the threshold.

8. The mobile system of claim 7, further comprising:

reverse direction logic to utilize a combination of network triangulation data, global positioning data, and step data, to calculate the directions to the flagged location such that the directions are provided even when one or more of the signals becomes unavailable.

9. The mobile system of claim 7, further comprising:

a flag uploader to send flag data to a database on a server, the database useful to determine a coverage of each of the plurality of signals.

10. The mobile system of claim 9, wherein information in the database associated with a location data of a flag additionally includes one or more of: receiving device, cellular carrier, chip set, time and day, and proximate location of the device and the user.

11. The mobile system of claim 9, further comprising:

a flag downloader to enable a user to obtain flag data from the database, to pre-populate an area with the predicted flags based on information in the global database, the flag downloader utilizing the wireless network for downloading the flag data when the wireless network is available, and otherwise utilizing the cellular network.

12. The mobile system of claim 8, further comprising:

the reverse direction logic, when the flag has been placed, continuously calculating directions to the flagged position, using one or more of GPS data, motion detector data, and network triangulation data.

13. The mobile system of claim 12, further comprising:

the flagger to remove the flag, and turn off the reverse direction logic when a current location is determined to have a signal quality above a threshold.

* * * * *